United States Patent [19]
Gutman et al.

[11] Patent Number: 5,691,729
[45] Date of Patent: Nov. 25, 1997

[54] APERTURE-TO-RECEIVER GAIN EQUALIZATION IN MULTI-BEAM RECEIVING SYSTEMS

[75] Inventors: John H. Gutman, Brandon, Vt.; John C. Papson, Melville, N.Y.

[73] Assignee: Hazeltine Corporation, Greenlawn, N.Y.

[21] Appl. No.: 740,803

[22] Filed: Nov. 4, 1996

[51] Int. Cl.$^6$ .................................. G01S 3/02; G01S 3/12
[52] U.S. Cl. .......................... 342/374; 342/151; 342/155; 455/277.2
[58] Field of Search ..................... 342/374, 151, 342/155; 455/277.2

[56] References Cited

U.S. PATENT DOCUMENTS

| | | | |
|---|---|---|---|
| 4,991,109 | 2/1991 | Crookshanks | 364/518 |
| 5,241,316 | 8/1993 | Pringle | 342/151 |
| 5,245,425 | 9/1993 | Klatt . | |
| 5,514,865 | 5/1996 | O'Neil | 250/208.1 |

*Primary Examiner*—Theodore M. Blum
*Attorney, Agent, or Firm*—Edward A. Onders; Kenneth P. Robinson

[57] ABSTRACT

Where two or more antenna beams may receive signals from the same cellular communication system user, post-reception beam channel gain variations may obscure choice of the channel providing the strongest user signal. Thermal atmospheric noise, assumed to equally enter each beam, is utilized as a standard signal level in order to calibrate the relative gain factor for each channel. Thermal noise level is measured by use of a single common receiver (32) sequentially coupled to each channel (22–25) to listen for lowest signal levels during inactive intervals, over periods of time which may extend for hours. Lowest signal levels provide thresholds for each channel from which gain correction factors are developed. When a user signal is received in two channels, the gain correction factors are employed to select the channel providing the best signal, on a substantially real time basis. A long-term lowest signal level monitoring algorithm is described.

29 Claims, 3 Drawing Sheets

_5,691,729_

APERTURE-TO-RECEIVER GAIN EQUALIZATION IN MULTI-BEAM RECEIVING SYSTEMS

This invention relates to beam channel gain equalization in multi-beam antenna systems and, more particularly, to methods for aperture-to-receiver gain equalization between beam channels in cellular radio systems to enhance beam channel selection based on received signal strength.

BACKGROUND OF THE INVENTION

Usage and installation of cellular radio systems are rapidly expanding. As a result, system capabilities and capacities for both volume of concurrent user messages and system coverage area are increasingly important for operative and economic reasons. Increased volume or increased coverage area, or both, can enable required user capacity to be provided with fewer system installations.

Multi-beam antenna systems provide capabilities addressing these objectives. For example, using available antenna technology, coverage for a 90 degree cell sector can be provided by an antenna configuration fed by a beam forming network. Four side-by-side antenna beams each about 22.5 degrees in azimuth width at their half-power points can cover the 90 degree sector. With such an arrangement of four beams, the adjacent beams will cross over or overlap each other at their half-power points. As a result, a user signal incident to the antenna system at an angle at or in the vicinity of a beam crossover angle will be received via both adjacent antenna beams.

By use of such a multi-beam arrangement, increased coverage results from greater usable range provided by the narrower, higher gain antenna beams, as compared to a single 90 degree beam pattern. For most effective operation, communication with a mobile user in the sector requires selection of the beam enabling reception of the strongest signal, e.g., reception of a user signal with the highest relative signal level. For a user signal incident at an angle near the center line of a particular beam, beam selection for highest signal strength is relatively easy. However, if a particular user signal is incident to the antenna system at an azimuth angle at or close to a beam crossover angle, the user signal will appear in the beam channel of each of the two adjacent beams with comparable signal strength. The term "beam channel" is used to refer to the signal transmission path (e.g., cables, amplifiers, switches, etc.) from the antenna aperture to a receiver located some distance from the antenna as effective for coupling signals received via a specific antenna beam.

Even in the case of comparable signal strength in two adjacent beam channels, the beam channel providing the strongest signal can be selected for reception of the user's signal. If signal amplitude in two channels is equal an arbitrary choice can be made. A problem can arise, however, if the received user signal is coupled from antenna to receiver via two beam channels having different aperture to receiver gains. Simply put, a beam channel receiving a weaker user signal, but having higher overall beam channel gain, may be selected over a second beam channel which is actually receiving a stronger user signal, if the second channel has a lower overall beam channel gain. If that result occurs, system performance will typically be degraded because the highest quality received signal has not been selected. At the limit, selection of the weaker version of the user signal may foreclose acceptable intelligibility, while selection of the stronger version (as received at the aperture) might have enabled acceptable communication of the information content of the user signal.

It has been found that in the worst case, for an incident angle near or at a beam crossover angle, a channel gain differential can degrade performance on a dB for dB basis. Thus, if beam A receives a user signal at a level 3 dB below the signal strength at which the same user signal is received in beam B, but beam channel A has a 3 dB higher gain from aperture to receiver, selection of channel A can cause the system to operate with 3 dB poorer signal quality for the user signal. A typical antenna system may include beam channels from aperture to receiver having as much as 40 dB nominal gain to overcome 30 dB nominal loss. Channel gain may be provided by preamplifier units, for example. Channel loss is typically caused by inclusion of successive lengths of interconnecting cable, as well as switches and other electronic components and coupling devices. With such configurations, initial beam channel gain may differ significantly from channel to channel and, after installation, component aging and drift may also result in further differences in relative channel gains. Thus, for a variety of reasons there can be significant difference between gains in adjacent beam channels and such differences in gain can mask differences in received signal levels and affect system performance.

Objectives of the present invention are to provide new and improved methods for aperture-to-receiver gain equalization for beam channels of a multi-beam receiving system, particularly such a system employing beam channel selection based on received signal strength. Methods in accordance with the invention typically provide one or more of the following characteristics and capabilities:

- automated gain equalization for a plurality of beam channels;
- enhanced multi-beam system performance through improved beam selection for strongest received signal;
- beneficial utilization of low level noise signals (e.g., receiver front end noise signals) inherently available between information signals;
- multi-channel relative gain calibration without use of a reference signal generator;
- optimized multi-beam cellular system operation by improved beam selection; and
- economical derivation of gain correction factors for equalization of aperture-to-receiver gains of parallel beam channels.

SUMMARY OF THE INVENTION

In accordance with the invention, a method of aperture-to-receiver gain equalization, for use in a multi-beam receiving system employing beam channel selection, equalization includes the steps of:

(a) providing a plurality of antenna to receiver beam channels each coupling a signal representative of a signal received via one of a plurality of partially overlapping antenna beams;

(b) determining for a first beam channel a threshold level representing the lowest signal level measure during an initial period;

(c) after the initial period, monitoring signal level in the first beam channel during a monitoring period to determine a subsequent lowest signal level;

(d) comparing such subsequent lowest signal level to the threshold level to derive a first gain correction factor for the first beam channel;

(e) repeating steps (b) through (d) for a second beam channel of the plurality of beam channels, to derive a second gain correction factor for the second beam channel;

(f) utilizing the first and second gain correction factors to provide respective adjusted signal levels for information signals received in such channels; and (g) selecting for reception of the information signal the one of the first and second beam channels providing the highest adjusted information signal level.

In application of the invention, it may typically be arranged that the threshold level in step (b) represents the lowest instantaneous signal level measured during an initial period which exceeds one hour in duration, with such signal level representing an inherent noise level (i.e., thermal noise) measured during periods between reception of successive information signals. The same approach can be followed in determining a subsequent lowest signal level in step (c). Also, in order to improve stability of operation, it has been found desirable to gradually increase the threshold level to a higher level during the step (c) monitoring period, while determining a subsequent lowest signal level, as will be further discussed.

For a better understanding of the invention, together with other and further objects, reference is made to the accompanying drawings and the scope of the invention will be pointed out in the accompanying claims.

DETAILED DESCRIPTION OF THE INVENTION

Figure 1:
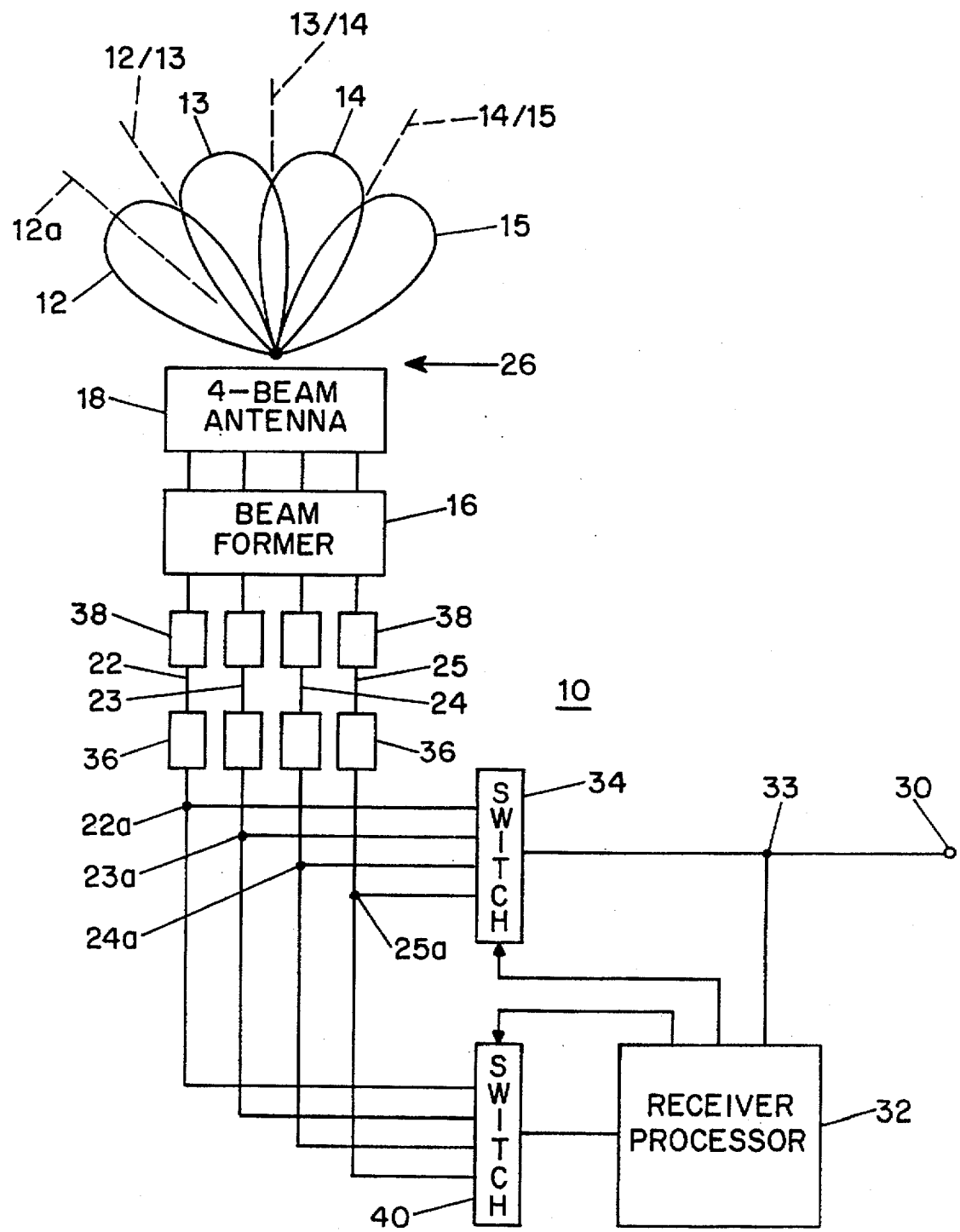
FIG. 1 is a simplified block diagram of a multi-beam receiving system including a parallel configuration of selectable aperture-to-receiver beam channels.

FIG. 1 is a simplified block diagram of a multi-beam receiving system 10 suitable for receiving cellular radio signals from users located within a 120 degree sector relative to an antenna installation. While the 120 degree sector could, for example, be covered by an antenna having a radiation pattern providing a single beam with a 120 degree beam width, higher gain coverage can be provided by use of four beams 12, 13, 14, 15, each nominally 30 degrees wide at half power points, as illustrated. Thus by use of a suitable beam forming network 16 coupled to a suitable form of antenna 18 comprising an array or other configuration of radiating elements, received signals representative of the beams 12, 13, 14 15 can, in known manner, be made available in beam channels 22, 23, 24, 25, respectively.

With this arrangement, signals received at aperture 26 of antenna 18 are coupled from the antenna, which may be remotely positioned on the top of a tower or building, to a receiver installation for processing of signals and distribution to intended information signal recipients, via wire or other communication facility. On a simplified basis, an incoming signal is received via one of beams 12–15 and provided at output port 30 for suitable transmission to the intended recipient. Receiver processor 32 is arranged to control switch 34 for this purpose, and may be responsive to comparison of signal strength in channels 22–25 prior to switch 34 (or after switch 34, if the switch initially is operated on a sampling basis). In a currently preferred embodiment, sampling is accomplished via points 22a, 23a, 24a and 25a prior to switch 34, in which case the connection of receiver processor 32 to point 33 may be omitted.

In the most straightforward case, a user transmitting a cellular signal may be positioned at an azimuth location relative to antenna 18, such that the user signal is received primarily along centerline 12a of beam 12. In this simple case beam 12 and beam channel 22, providing signals representative of beam 12, will provide the strongest signal level for the received signal. However, if the user is positioned so that the user signal is incident to the antenna 18 at an angle corresponding to one of lines 12/13, 13/14 or 14/15, the signal will be received in two adjacent beams with equal signal strength. This will also be true for incident angles relatively close to the azimuths represented by lines 12/13, 13/14 and 14/15, although the signal levels in the two beams will differ, depending on the gain provided by the radiation pattern effective for a particular angle.

As discussed above, best system performance will be achieved by selecting the beam channel containing the strongest signal, or highest signal level, for an incoming received signal. However, such signal selection must typically be made at a receiver installation remote from the antenna, so that differences in aperture-to-receiver gain may override or obscure actual signal level differences in a received signal which has been coupled via different beam channels. It will be appreciated that in a particular instance, attainment of such best system performance may be obviated by some overriding factor (e.g., channel noise, component failure, etc.) however such effects are beyond the scope of present considerations.

As shown in FIG. 1, output port 30, from which received signals are made available for further processing and transmission to an intended recipient, is remote from antenna 18. Each of beam channels 22–25 may typically include successive lengths of interconnecting coaxial or other cable as well as switches and other electronic components and coupling devices. In FIG. 1 the various electronic components and connectors which may be included in a beam channel are represented collectively by switch 34, the intercoupling line sections, as shown, and units 36 generally representing other transmission path components. In total, such line sections and components may represent a level of signal loss or degradation of the order of 30 dB, for example. To offset such loss in order to provide usable signal levels, preamplifier and other amplifier devices providing on the order of 40 dB gain may also be included in each of beam channels 22–25. For present purposes, the amplifier device or devices included in each beam channel are collectively represented by units 38.

During assembly of system 10 in accordance with the invention it will normally be desirable to select the various components for inclusion in each of beam channels 22–25 with the objective of providing closely similar, if not equal, aperture-to-receiver gains for each beam channel. However, small incremental differences in signal level can be significant in providing optimal system performance and there is a practical and economical limit to the level of effort which can be expended in component selection for overall beam channel gain equalization. As a practical matter, an approach to provide an acceptable level of gain equalization may be based on a manufacturing standard requiring the gain or loss provided by each specific unit, module and cable to be held within a tolerance of ±0.5 dB, for example, of a specified nominal value. Such a standard addresses beam channel gain equalization, while also permitting components to be employed on an interchangeable basis for initial assembly as well as field replacement. It will be appreciated, however, that if a channel-to-channel gain tolerance of ±0.5 dB or ±1.0 dB is desirable on an overall basis, even close individual component tolerances can not be relied upon to meet such overall tolerance between complete channels. In addition, even if channel gain could be closely equalized initially, component aging, field replacements, etc. could alter such gain equalization.

Pursuant to the invention, beam channel selection for best received signal strength in a system such as shown in FIG. 1, utilizes continuing derivation of gain correction factors. Such gain correction factors, representative of relative difference in aperture-to-receiver gain between beam channels, are applied to calibrate the level of an information signal received via different beam channels. With such calibration, in the nature of signal interpretation, compensation or adjustment, the beam channel actually providing a signal representative of the strongest version of the incoming information signal can be selected.

In FIG. 1, receiver processor 32 includes a single common receiver arranged to obtain signal level measurements for each of channels 22–25 on a repetitive scanned basis. As illustrated, receiver processor 32 is coupled to respective signal sampling points 22a, 23a, 24a and 25a of channels 22–25, via scanning switch 40. Switch 40 is effective to sequentially couple samples of signals from particular ones of channels 22–25 to receiver processor 32, under receiver processor control or on a pre-programmed sequential basis. Gain correction factors reflecting channel-to-channel differences in threshold levels representing lowest signal levels measured in the channels are developed by receiver processor 32. Then, when a user signal is received via two of the channels the gain correction factors are utilized to compare the signal levels to enable selection of the channel receiving the highest signal level. Under the control of receiver processor 32, switch 34 is activated to couple the selected channel to output port 30 to enable further processing and use of a received information signal by an intended recipient. By use of a single common receiver to receive signal samples from all of the channels, distortion of results due to variations in receiver parameters are avoided (i.e., a "common yardstick" is used for relative measurements).

A key feature of methods in accordance with the invention is the constructive use of noise signals (e.g., front end noise) appearing in a beam channel when no information signal is present. Thus, the noise signal utilized typically represents a combination of thermal noise (e.g., antenna looking at 300 degree Kelvin ambient temperature of the atmosphere), plus a small contribution from a preamplifier, amounting to about a 1.2 to 1.5 dB noise figure. Pursuant to the invention, monitoring of the lowest signal level appearing in a beam channel over an extended period of time is utilized to represent the monitoring of how a standard signal is affected by the aperture-to-receiver gain of a beam channel. Accordingly, if two beam channels actually had identical aperture-to-receiver gains, the measured amplitude of the lowest signal level at the beam channel outputs (typically representing front end noise) would also be identical. Since the lowest noise signal thus provides a standard signal level in each channel, channel-to-channel differences in aperture-to-receiver gain can be determined as gain correction factors. Then, when an information signal of unknown relative signal level is received in each of two beam channels, the gain correction factors can be used to select the channel actually providing the strongest received signal level.

A measurement of the lowest signal level in a beam channel cannot reliably be made at any preselected instant in time. An incoming information signal, an interference signal, a burst of noise, or some other effect may increase the signal level at any selected instant in time. In view of this, the invention utilizes an extended listening period, possibly of an hour or several hours, in order to determine the lowest instantaneous signal level measured at any time within such extended period. For a given system, a determination can be made on the basis of repeatability, channel-to-channel consistency, etc., as to choice of an appropriate listening period duration.

Typically, once a lowest signal level is determined for a given beam channel, it is considered as a threshold value for that channel. Then, lowest instantaneous signal level monitoring is continued during system operating periods and if a lower signal level is experienced, it is used as the new basis for the threshold value. As will be further described, on an extended time basis a technique such as slowly increasing the threshold value (subject to occurrence and recognition of lower lowest signal levels) may be employed. Such technique enables system recognition of a channel gain which degrades for some reason and can also be arranged to avoid unstable operating conditions, such as open looping upon a slow gain change in a particular direction. For similar reasons of overall system accuracy and stability, it may also be desirable to program operation for re-initialization to periodically carry out a new threshold selection independently of the value of a threshold previously utilized for a given channel.

Figure 2:
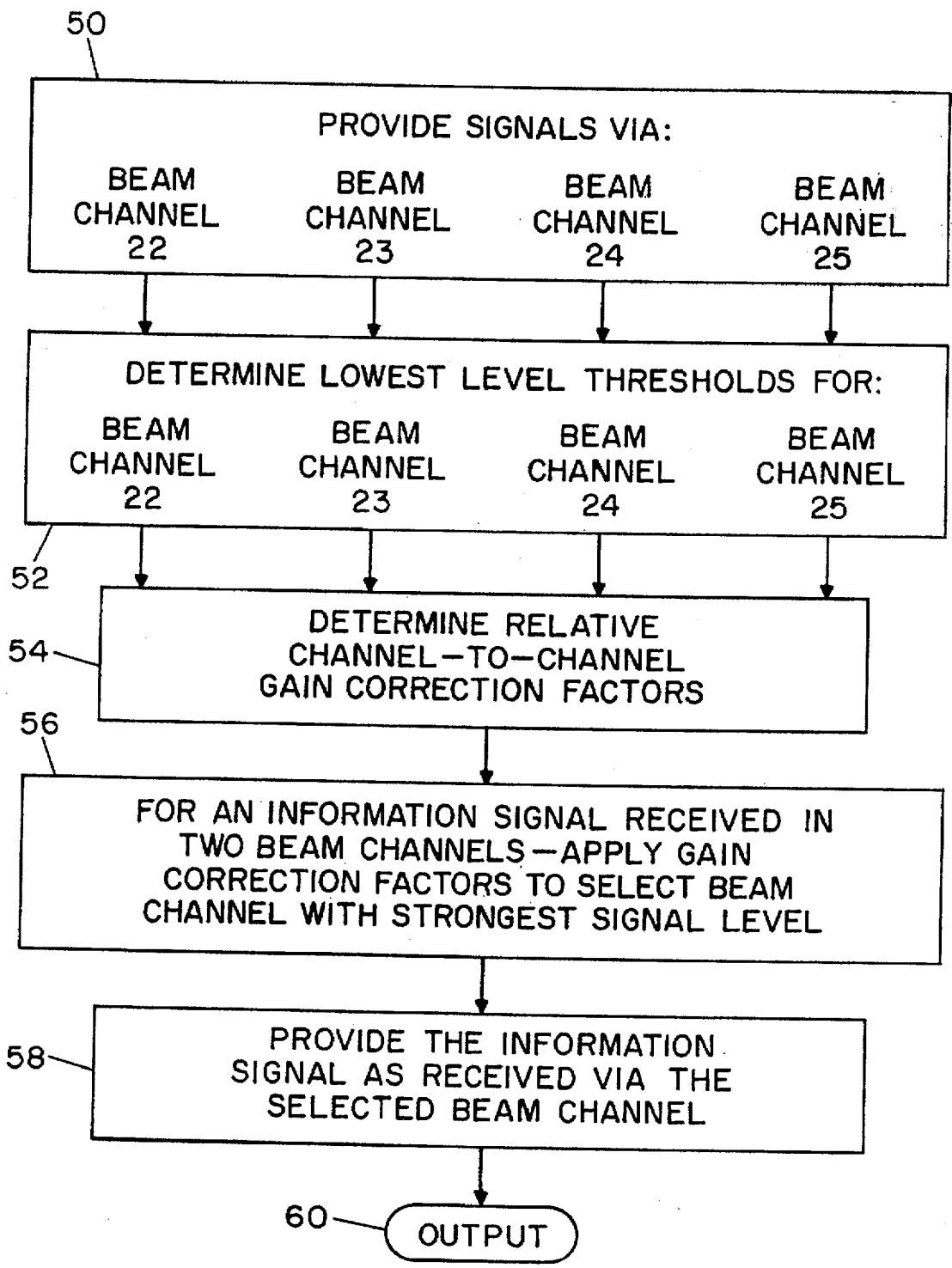
FIG. 2 is a flow chart useful in describing a method of aperture-to-receiver gain equalization in accordance with the invention.

A method of aperture-to-receiver gain equalization in accordance with the invention can be more particularly considered with reference to the flow chart of FIG. 2. The invention provides methods of aperture-to-receiver gain equalization particularly applicable to use for beam channel selection to provide improved signal reception in a multi-beam receiving system.

At step 50 of FIG. 2, signals are provided via beam channels 22, 23, 24, 25. With reference to FIG. 1, this may be accomplished by providing a plurality of beam channels 22–25. Each beam channel is arranged to couple a signal received via one of a plurality of respective antenna beams 12–15 which, as discussed with reference to FIG. 1, are arranged in partially overlapping beam pattern relationship to provide coverage of a selected cell sector. It will be appreciated that, under normal operating conditions, at different instants of time the signals provided via the individual beam channels may comprise:

(i) information signals received via one or more beams, depending on the azimuth position of a mobile user;

(ii) local or other noise, spurious or interference signals received via one or more beams at different or the same signal levels; or (iii) low level background or "front end" noise which can be expected to be present simultaneously in all beam channels at identical or nearly identical levels.

In FIG. 2, at step 52 there is determined for each beam channel 22–25 a threshold level representative of the lowest signal level measured in a time period (e.g., the lowest instantaneous signal level measured at receiver processor 32 of FIG. 1 over a one hour period). It will be appreciated that even though there may be incoming information signals being processed, there will be quiet instants between such signals. By monitoring signal level over a long enough period of time (e.g., for a fraction or multiple of an hour, depending partially on the particular embodiment) there can be a high degree of certainty that the lowest instantaneous signal level measured represents a background type of noise level which will commonly and equally affect each beam channel.

At step 54, channel-to-channel differences in the threshold level for each of channels 22–25 are utilized to derive gain correction factors. Such gain correction factors will be representative of relative difference in aperture-to-receiver gain between the beam channels. The gain correction factors may be provided in any suitable form and may, for example, each include a suitable base constant or pedestal value, so that the smallest factor is represented by such pedestal value and others are respectively larger, to reflect channel-to-channel gain differences.

At step 56, the gain correction factors are applied for channel selection purposes. Based on the previous discussion, it will be recalled that if an incoming user signal appears in two beam channels operating performance is enhanced (or performance degradation is avoided) by use of the signal from the beam channel receiving the strongest version of the information signal. Merely comparing signal levels of the same signal at the outputs of two beam channels may be misleading, because a stronger signal in one channel may be overshadowed by a higher gain in the other channel (making its version of the signal appear stronger). With the availability of the gain correction factor, it will be apparent to skilled persons that such factors can be applied in a variety of ways in order to compare the signal level of a user signal incoming via two adjacent beam channels. Thus depending upon the particular implementation, the gain correction factors may be applied via a circuit arranged: to interpret relative signal levels in view of the relevant factor or factors; to compensate one signal level for comparison with the other signal level; to adjust the signal levels to enable direct comparison; etc. A microprocessor or other suitable arrangement may thus be provided to rapidly apply a gain correction factor to one or both adjacent channels, in order to offset the inherent relative gain difference in aperture-to-receiver gain. By reducing the effect of the relative gain difference between the channels, beam channel selection for reception and processing of the stronger version of the received signal is enabled.

With selection of the beam channel providing the higher level of the incoming user signal, at step 58 in FIG. 2 information signals as received from that user are provided for further processing and at 60 can be provided as an output for communication to the user's intended recipient.

It will be appreciated, with reference to FIG. 1, that a particular user signal may have been incoming via beams 12 and 13 and beam channels 22 and 23. A second user signal may then be received via beams 14 and 15 and beam channels 23 and 24, for example. The same method of channel selection is repeated to select beam channel 23 or 24 as providing the strongest version of the second user signal. Such additional channel selections may be implemented in series or additional system capabilities may be added to the FIG. 1 arrangement to enable more than one channel selection process to be implemented at the same time, in parallel operations. Also, the first user may be in a moving vehicle so that whereas the strongest signal for this user was initially received via beam 12, the strongest signal for this user may later be received via beam 13. With an understanding of the invention, skilled persons will be enabled to provide repetitive channel selection processing, and other variations and combinations of processing steps, as suitable to a variety of system implementations, operating volume of incoming calls and other parameters. In this context, it will be appreciated that the invention may be applied to antenna systems providing two or more beams, and is not limited to a four beam system as described by way of example.

Pursuant to the foregoing, in order to enable selection of one beam channel for reception of an information signal incoming via two beam channels, a method of aperture-to-receiver gain equalization may include the steps of:
(a) providing a plurality of antenna-to-receiver beam channels each coupling a signal representative of a signal received via one of a plurality of partially overlapping antenna beams;
(b) determining for a first beam channel a threshold level representing the lowest signal level measured during an initial time period;
(c) after the initial period, monitoring signal level in the first beam channel during a monitoring period to determine a subsequent lowest signal level;
(d) comparing the subsequent lowest signal level to the threshold level to derive a gain correction factor for the first beam channel; and
(e) utilizing the gain correction factor as a signal strength adjustment for the first channel during beam channel selection for reception of an information signal.

Figure 3:
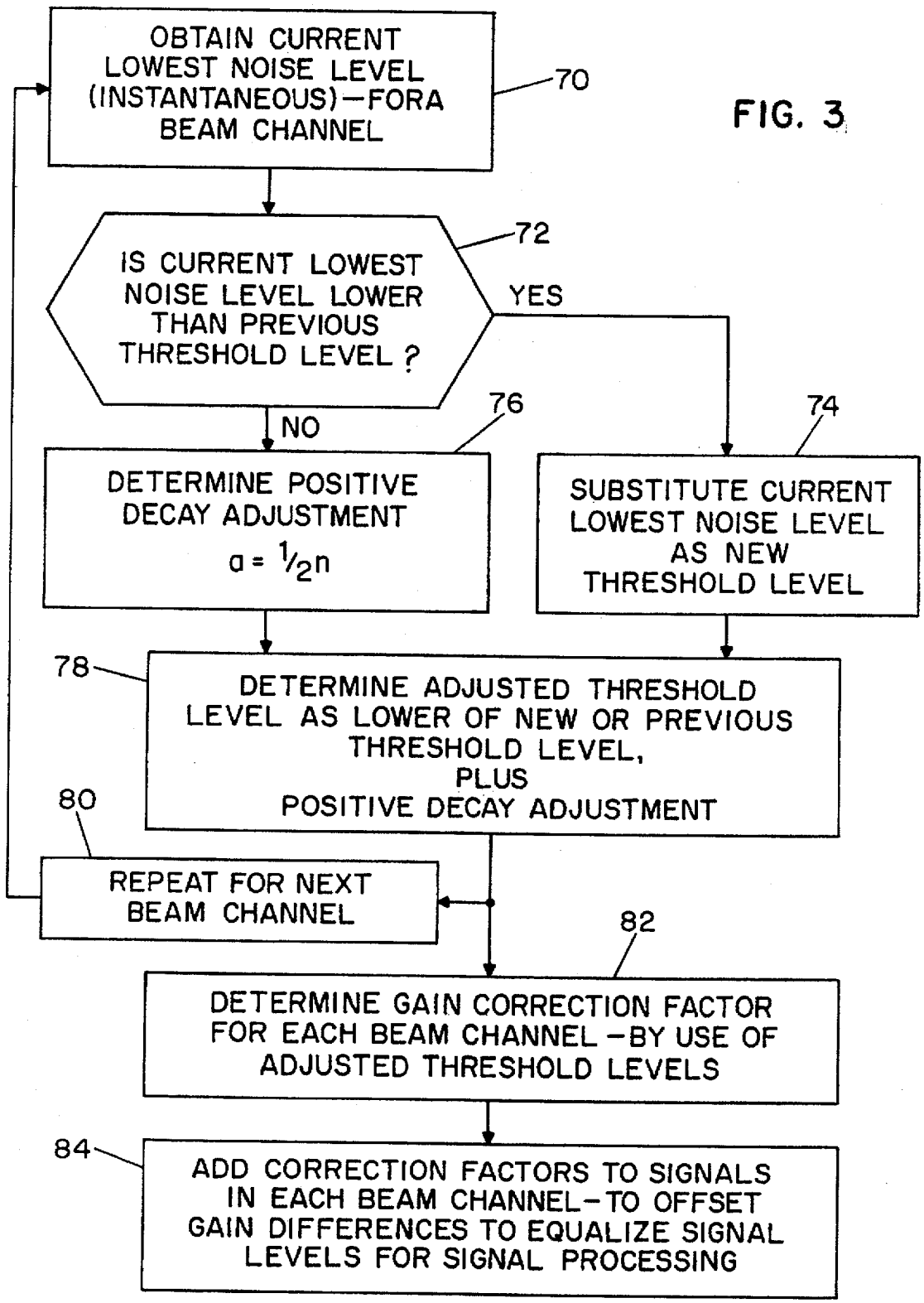
FIG. 3 is a flow chart useful in describing a method of positive decay adjustment of lowest noise threshold value in application of a gain equalization method in accordance with the invention.

Referring now to FIG. 3, there is illustrated a flow chart for a threshold level management method, in accordance with the invention. Essentially, as described above, the current lowest signal level, measured on an instantaneous basis for a particular beam channel is the threshold level for that channel. However, in particular applications it will be necessary to avoid the possibility of an "open looping" effect whereby a threshold level is set at a specific level, but the aperture-to-receiver gain for that channel thereafter decreases to a lower level (e.g., due to a relatively small degradation in component or amplifier characteristics). As a result, the threshold level should be set higher for that beam channel relative to the other beam channels, but the lower existing threshold would preclude recognition of a new higher threshold level. In accordance with a currently preferred embodiment, this result of potentially retaining an erroneously low threshold value for a particular channel is avoided by a programmed increase in the threshold level. Thus, by introducing an artificial very gradual increase in the threshold level, the opportunity for accurate reset of the threshold level is enhanced. As the threshold is gradually increased to higher and higher levels (by a ramping constant applied for all channels) a point will be reached at which a measured lowest noise level will cause the threshold level to be reset to a new threshold level based on an actual present measurement of the lowest instantaneous noise signal.

With reference to FIG. 3, at step 70 a current lowest noise measurement is provided for a beam channel (e.g., channel 22 of FIG. 1). At step 72 that current lowest noise level is compared to the previously selected threshold level for that channel. The previous threshold level may represent a previously measured lowest noise level for channel 22, for example, or, in a start-up mode, a predetermined threshold level assigned as an initial or default value.

If the current noise level is lower than the previous threshold level, at step 74 the current lowest noise level is substituted as the new threshold level. At step 76, a positive decay adjustment is determined. For example, such decay adjustment may be represented as a parameter "a" having a value equal to 1 over $2^n$, which for a value of n−21 can be arranged to provide a gradual voltage rise from zero to 0.5 volts over a period of about 4.4 hours. In a particular application, the decay adjustment could be initiated with a starting value of 0.25 volts and be arranged to increase from 0.25 volts to 0.75 volts over a period such as 4.4 hours. A very gradual increase useful as a positive decay adjustment is thus provided as a control against open looping effects.

In FIG. 3, at step 78 an adjusted threshold level is determined as the total of (a) the lower of the new threshold level from step 74 or the threshold level as previously existing, plus (b) the current value of the positive decay adjustment from step 76.

At step 80, steps 70, 72, 74, 76 and 78 are repeated for the next beam channel (e.g., repetitiously for beam channels 23, 24, 25, 22, 23, 24, 25, 22, etc.). It will be appreciated that if the positive decay adjustment (growing at a slow rate over a period of hours) is applied in relatively close succession in determining adjusted threshold levels for each beam channel, the decay adjustment will effectively increase or distort the actual lowest noise levels of each channel by substantially the same amount. At step 82, gain correction factors are determined for each channel, based on channel-to-channel differences between the current adjusted threshold levels from step 78 for the various beam channels. With the positive decay adjustment affecting each beam channel by substantially the same amount, as discussed, the results of step 82 will effectively be independent of the value of the decay adjustment.

At step 84, the respective correction factor from step 82 is added to incoming signals in each of the beam channels to equalize signal levels for signal processing. Thus, assume that one the basis of comparison of the adjusted threshold levels it is determined at step 82 that the aperture-to-receiver gain of channel 22 is 2 dB higher than that of channel 23. Accordingly, at step 84 in this example a correction factor would be added to the signals in channel 23 relative to the signals in channel 22. With the aperture-to-receiver gains of the two channels thus equalized, the signal levels of a specific incoming user signal appearing in both channels can be directly compared in order to select the channel providing the strongest user signal for further processing and transmittal to the intended recipient. With an understanding of this example, persons skilled in cellular communications will be enabled to employ lowest level noise measurements in various channel selection applications, in accordance with the invention.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of aperture-to-receiver gain equalization to enable selection of one beam channel for reception of an information signal incoming via two beam channels, comprising the steps of:
   (a) providing a plurality of antenna-to-receiver beam channels, each to couple a signal received via one of a plurality of partially overlapping antenna beams;
   (b) determining for each beam channel a threshold level representative of the lowest signal level measured at a receiver during a time period, said signal level corresponding to a noise level with no information signal present;
   (c) providing gain correction factors reflecting channel-to-channel differences in said threshold level, said gain correction factors representative of relative difference in aperture-to-receiver gain between beam channels; and
   (d) comparing, with use of at least one said gain correction factor, the signal levels of a user signal as received via first and second beam channels, and selecting one of said first and second channels for reception of information signals from said user;
   said at least one gain correction factor being used in step (d) to offset a relative difference in aperture-to-receiver gain between said beam channels for channel selection purposes.

2. A method of aperture-to-receiver gain equalization as in claim 1, wherein in step (d) beam channel selection for reception of said information signal is based on the selection of the channel providing the highest information signal level, after offset of relative difference in aperture-to-receiver gain by use of said gain correction factor application.

3. A method of aperture-to-receiver gain equalization as in claim 1, wherein in step (d) comparing the signal levels comprises one of: interpreting, compensating and adjusting the signal level of said user signal as received via at least one beam channel.

4. A method of aperture-to-receiver gain equalization as in claim 1, wherein step (a) comprises providing, between a multi-beam antenna and a common receiver, said plurality of beam channels each of which includes receiving antenna, pre-amplifier, switch and transmission line components selectively coupled to said common receiver via an RF switch.

5. A method of aperture-to-receiver gain equalization as in claim 1, wherein step (a) includes selecting components of each beam channel to provide aperture-to-receiver gains which are initially equal, within a predetermined tolerance, for each of said plurality of beam channels.

6. A method of aperture-to-receiver gain equalization as in claim 1, wherein in step (b) said threshold level represents the lowest instantaneous signal level measured during said time period, and said time period exceeds one hour in duration.

7. A method of aperture-to-receiver gain equalization as in claim 1, wherein in step (b)) said lowest signal level represents a noise level measured between reception of successive information signals.

8. A method of aperture-to-receiver gain equalization as in claim 1, including the following additional steps:
   (e) after determining said threshold value for each beam channel in step (b), monitoring signal level in each said beam channel to determine a subsequent lowest signal level for each beam channel;
   (f) for each beam channel, comparing a subsequent lowest signal level for a beam channel to the threshold level previously determined for that beam channel, to determine a new threshold level when said subsequent lowest signal level represents a lower signal level than said threshold level previously determined for the respective beam channel; and
   (g) repeating steps (c) and (d) utilizing a new threshold level for each beam channel for which a new threshold level was determined in step (f).

9. A method of aperture-to-receiver gain equalization as in claim 8, wherein in step (e) said subsequent lowest signal level represents a lowest instantaneous noise signal level measured during a monitoring period exceeding one hour in duration.

10. A method of aperture-to-receiver gain equalization as in claim 1, wherein step (c) additionally includes, gradually increasing said threshold level to a higher level in order to improve stability of operation.

11. A method of aperture-to-receiver gain equalization as in claim 1, wherein in step (d) said gain correction factor is added to an incoming information signal level to enable beam channel selection based on the beam channel providing the highest adjusted information signal level.

12. A method of aperture-to-receiver gain equalization as in claim 1, wherein step (d) includes utilizing a single common receiver to determine said signal levels of the user signal as received via said first and second channels, so as to avoid effects of variations in receiver parameters.

13. A method of aperture-to-receiver gain equalization, for use in a multi-beam receiving system employing beam channel selection, comprising the steps of:

(a) providing a plurality of beam channels, each to couple a signal representative of a signal received via one of a plurality of antenna beams;

(b) determining for a first beam channel a threshold level representing a noise signal level;

(c) thereafter monitoring signal level in said first beam channel to determine a lowest signal level measured during a monitoring period;

(d) utilizing the lower of said threshold level and said lowest signal level to derive a gain correction factor for said first beam channel; and (e) utilizing said gain correction factor during beam channel selection for reception of an information signal.

14. A method of aperture-to-receiver gain equalization as in claim 13, wherein in step (b) said threshold level represents the lowest instantaneous signal level measured during an initial period, and said initial period exceeds one hour in duration.

15. A method of aperture-to-receiver gain equalization as in claim 13, wherein in step (c) said lowest signal level represents a noise level measured in at least one period between reception of successive information signals.

16. A method of aperture-to-receiver gain equalization as in claim 13, wherein in step (c) said lowest signal level represents the lowest instantaneous signal level measured during said monitoring period, and said monitoring period exceeds one hour in duration.

17. A method of aperture-to-receiver gain equalization as in claim 16, wherein in step (c) said lowest signal level represents a noise level measured between reception of successive information signals.

18. A method of aperture-to-receiver gain equalization as in claim 13, wherein step (b) additionally includes, gradually increasing said threshold level to a higher level during said monitoring period, in order to improve stability of operation.

19. A method of aperture-to-receiver gain equalization as in claim 13, wherein in step (e) said signal strength adjustment is added to an incoming information signal level to enable beam channel selection based on the beam channel providing the highest adjusted information signal level.

20. A method of aperture-to-receiver gain equalization, for use in a multi-beam receiving system employing beam channel selection, equalization comprising the steps of:

(a) providing a plurality of antenna-to-receiver beam channels each coupling a signal representative of a signal received via one of a plurality of partially overlapping antenna beams;

(b) determining for a first beam channel a first threshold level representative of the lowest signal level measured, during a time period, at a receiver coupled to said first beam channel;

(c) determining for a second beam channel a second threshold level representative of the lowest signal level measured, during a time period, at a receiver coupled to said second beam channel; and (d) utilizing said first and second threshold levels to derive a gain correction factor for at least one of said channels, said gain correction factor representative of relative difference in aperture-to-receiver gain between said first and second beam channels.

21. A method of aperture-to-receiver gain equalization as in claim 20, including the additional step of:

(e) comparing, with use of said gain correction factor, the signal levels of a user signal as received via each of said first and second beam channels, and selecting one of said first and second beam channels for reception of information signals from said user.

22. A method of aperture-to-receiver gain equalization as in claim 21, wherein in step (e) said gain correction factor is used to offset said relative difference in aperture-to-receiver gain between said first and second beam channels for channel selection purposes.

23. A method of aperture-to-receiver gain equalization as in claim 21, wherein in step (e) comparing the signal levels comprises one of interpreting, compensating and adjusting the signal level of said user signal as received via at least one beam channel.

24. A method of aperture-to-receiver gain equalization as in claim 20, wherein in steps (b) and (c) said first and second threshold levels represent the lowest instantaneous noise signal level measured during a time period exceeding one hour in duration.

25. A method of aperture-to-receiver gain equalization as in claim 20, wherein in steps (b) and (c) said first and second threshold levels represent a noise level measured between reception of successive information signals.

26. A method of aperture-to-receiver gain equalization as in claim 20, which includes sequentially utilizing in steps (b) and (c) a single common receiver for determining said first and second threshold levels.

27. A method of aperture-to-receiver gain equalization as in claim 20, including the additional steps of:

(x) monitoring signal level in said first beam channel during a subsequent time period to determine a subsequent lowest signal level;

(y) comparing said subsequent lowest signal level to said first threshold level and for purposes of step (d) utilizing for said first beam channel a threshold level representative of the lower of said first threshold level and said subsequent lowest signal level.

28. A method of aperture-to-receiver gain equalization as in claim 27, wherein step (b) additionally includes gradually increasing said first threshold level to higher levels, in order to improve stability of operation.

29. A method of aperture-to-receiver gain equalization as in claim 20, wherein steps (b) and (c) additionally include gradually increasing said first and second threshold levels to higher levels in order to improve stability of operation.

* * * * *